United States Patent
Lazar et al.

(10) Patent No.: US 12,134,248 B2
(45) Date of Patent: Nov. 5, 2024

(54) LAMINATED GLASS HAVING AREAS WITH DIFFERENT REFRACTIVE INDICES

(71) Applicant: KURARAY EUROPE GMBH, Hattersheim (DE)

(72) Inventors: Ion Lazar, Troisdorf (DE); Robin Eschrich, Troisdorf (DE); Leonard Volpi, Troisdorf (DE)

(73) Assignee: Kuraray Europe GmbH, Hattersheim (DE)

(*) Notice: Subject to any disclaimer, the term of this patent is extended or adjusted under 35 U.S.C. 154(b) by 414 days.

(21) Appl. No.: 17/433,160

(22) PCT Filed: Feb. 21, 2020

(86) PCT No.: PCT/EP2020/054679
§ 371 (c)(1),
(2) Date: Aug. 23, 2021

(87) PCT Pub. No.: WO2020/173838
PCT Pub. Date: Sep. 3, 2020

(65) Prior Publication Data
US 2022/0152985 A1 May 19, 2022

(30) Foreign Application Priority Data
Feb. 27, 2019 (EP) ..................................... 19159848

(51) Int. Cl.
*B32B 3/26* (2006.01)
*B32B 17/10* (2006.01)

(52) U.S. Cl.
CPC .... *B32B 17/10036* (2013.01); *B32B 17/1055* (2013.01); *B32B 2315/08* (2013.01); *B32B 2329/06* (2013.01)

(58) Field of Classification Search
CPC ........................ B32B 17/1055; B32B 2250/40
See application file for complete search history.

(56) References Cited

U.S. PATENT DOCUMENTS

| 2014/0363651 A1 | 12/2014 | Lu et al. |
| 2016/0159049 A1* | 6/2016 | Lu ........................... B32B 27/30 428/515 |
| 2019/0047261 A1 | 2/2019 | Keller |

OTHER PUBLICATIONS

International Search Report, PCT/EP2020/054679, dated Apr. 21, 2020. 2 pages.

* cited by examiner

*Primary Examiner* — William P Watkins, III
(74) *Attorney, Agent, or Firm* — BROOKS KUSHMAN P.C.

(57) ABSTRACT

A laminated glass capable of producing an observable pattern when edge-illuminated contains two sheets of glass adhered by an adhesive film of at least one film B containing a polyvinyl acetal PB and at least one plasticizer WB; and at least one film A or an area thereof containing a polyvinyl acetal PA and optionally at least one plasticizer WA, wherein the refractive indices of film A and film B differ by at least 0.0002.

16 Claims, 3 Drawing Sheets

LAMINATED GLASS HAVING AREAS WITH DIFFERENT REFRACTIVE INDICES

CROSS REFERENCE TO RELATED APPLICATIONS

This application is the U.S. National Phase of PCT Appln. No. PCT/EP2020/054679 filed Feb. 21, 2020, which claims priority to European Application No. EP 19159848.1 filed Feb. 27, 2019, the disclosures of which are incorporated in their entirety by reference herein.

BACKGROUND OF THE INVENTION

1. Field of the Invention

The present invention relates to laminated glass, especially windshields or laminates used in architecture, which are provided with different refractive indices when illuminated from its edges or its sides.

2. Description of the Related Art

Often polyvinyl butyral (PVB) interlayers for glass laminates are offered in low quality. However, ones these interlayers are laminated together with the glass panes to form the final glazing, it is very difficult for the end customer to see whether a genuine product has been used for the glazing.

Accordingly, it was an object of the invention to provide laminates which make it possible to detect whether a genuine PVB interlayer has been used. The present inventors have found that interlayers using two separate films in the interlayers with different refractive indices solve this object. When illuminated from its edges or its sides patterns can be made visible like watermarks.

SUMMARY OF THE INVENTION

An object of the present invention was therefore a laminated glass comprising two sheets of glass, combined by an adhesive film comprising at least one film B containing a polyvinyl acetal PB and at least one plasticiser WB; and at least one area A containing a polyvinyl acetal PA and optionally at least one plasticiser WA, wherein the refractive indices of film A and film B differ by at least 0.0002.

DETAILED DESCRIPTION OF THE PREFERRED EMBODIMENTS

Figure 1:
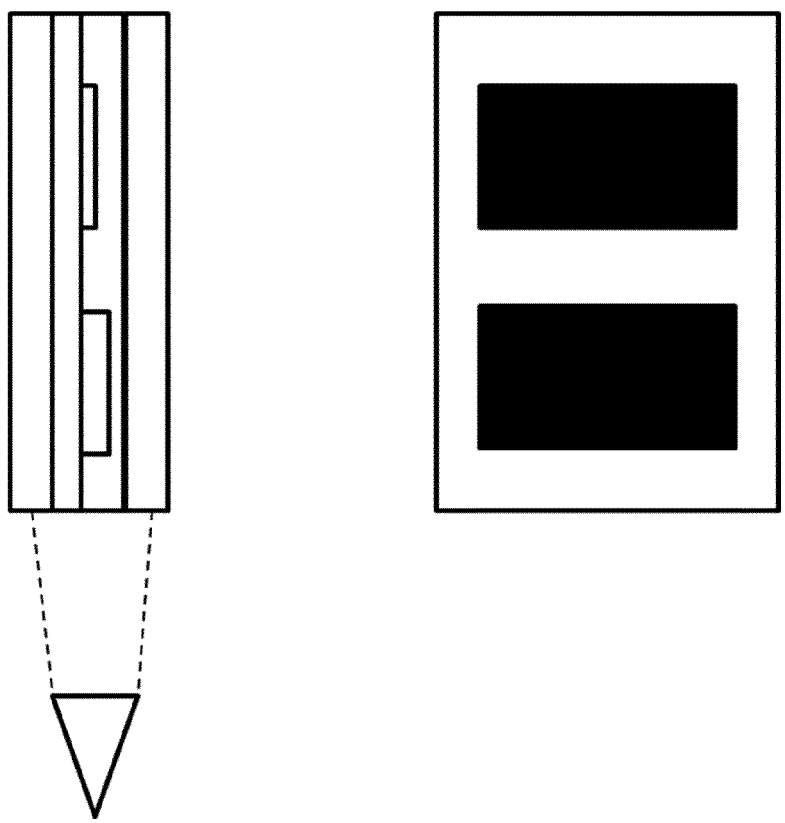
FIGS. 1 to 6 illustrate the invention and possible patterns detected by two films with different refractive indices when illuminated.
Figure 2:
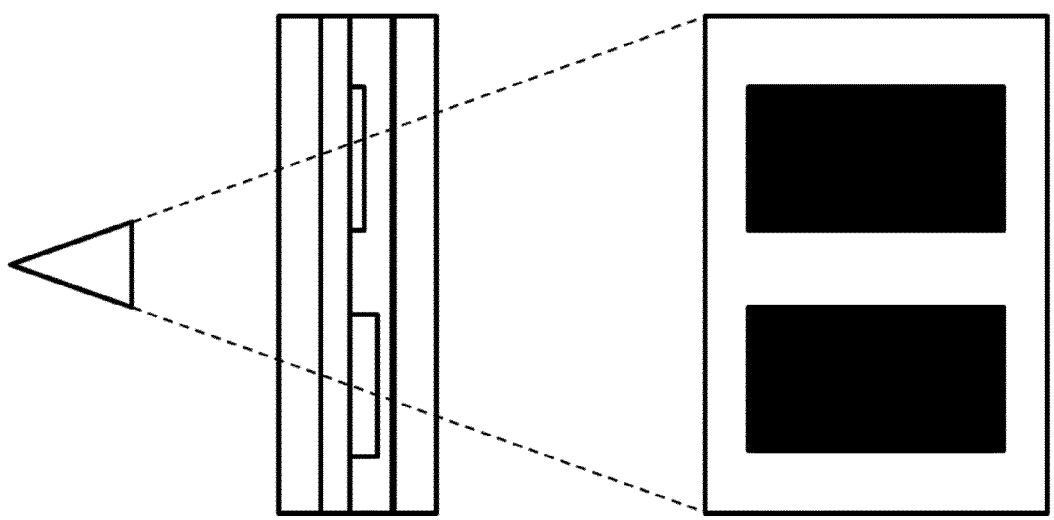
Figure 3:
Figure 4:
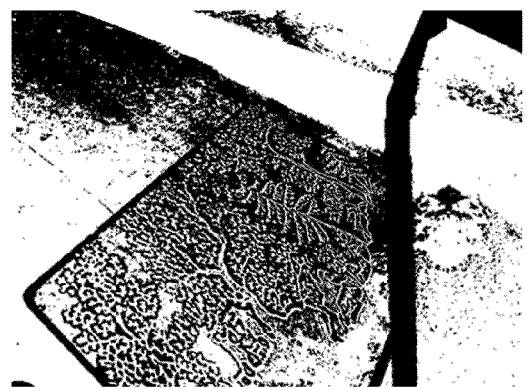
Figure 5:
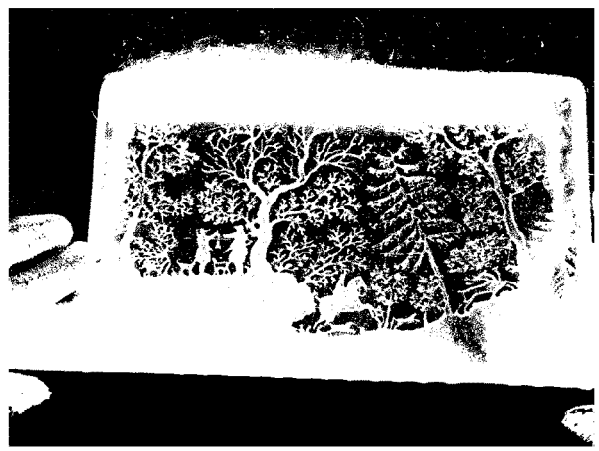
Figure 6:
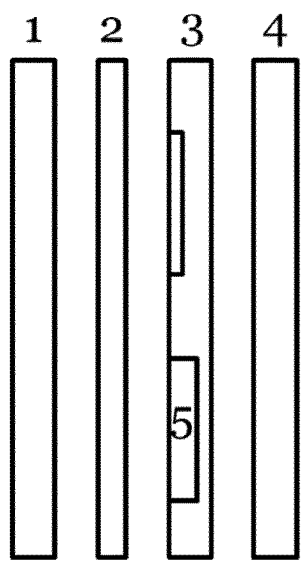

The patterns of film A having a different refractive index than film B can be applied to film B by various techniques known to the skilled person. Film A can be manufactured by extrusion, then cut or punched into shape and co-laminated with film B. Alternatively, PVB can be printed, e.g. 3D printed, onto film B or onto a glass sheet, then co-laminated to film B, forming a film A.

Preferably, the thickness of film A is at least 5 μm.

In a first embodiment, the laminated glass has two surface areas and at least three edge areas, wherein the refractive indices of film A and film B differ by at least 0.0002 when the laminated glass is illuminated from one of the edge areas or surface areas.

In a second embodiment, at least one of the edge areas or surface areas is provided with an illumination device or sunlight.

In a third embodiment, prior to combining the two glass sheets, the amount of plasticiser WA in film A is less than 45% by weight and the amount of plasticiser WB in film B is less than 45% by weight.

In a fifth embodiment, film A is provided by printing a melt comprising polyvinyl acetal PA and optionally at least one plasticiser WA on or into film B.

In a sixth embodiment, film A is provided by combining film B with a cut out or punched pattern of a film A comprising polyvinyl acetal PA and optionally at least one plasticiser WA.

In a seventh embodiment, one or more films A are sandwiched between two films B comprising the same or a different polyvinyl acetal PB and at least one plasticiser WB.

In a eighth embodiment, film A comprises an inorganic filler, pigment or dye.

In a ninth first embodiment, film B comprises an inorganic filler, pigment or dye.

In a tenth embodiment, the thickness ratio of film A to film B is between 0.002 and 1, preferably 0.002 and 0.2.

In an eleventh embodiment, film B comprises at least two layers wherein the amount of plasticizer WB in the layers differs by least 2% by weight.

In a twelfth embodiment, film B has a wedge-shaped thickness profile.

Another object of the invention is a process for manufacturing a laminated glass by combining two sheets of glass with an adhesive film comprising least one film B containing a polyvinyl acetal PB and at least one plasticiser WB; and at least one film A containing a polyvinyl acetal PA and optionally at least one plasticiser WA wherein the refractive indices of film A and film B differ by at least 0.0002 by printing a melt containing a polyvinyl acetal PA and optionally at least one plasticiser WA on or into film B.

Hereinafter, the term "prior to lamination" refers to the state of the films A and B prior to having any contact to each other. For example, the term refers to the composition of each film separately formed and separately wound onto individual rolls. The term "prior to lamination" refers to the state for the layers or films before combining them either in the lamination process of the laminated glass or prior to building a stack from the layers used for lamination.

The term "area A" refers to areas having a continuous or interrupted surface comprising a mixture of containing a polyvinyl acetal PA and optionally at least one plasticiser WA. Preferably, area A is provided by a film. It should be noted that throughout this application, the terms "film A" and "area A" are used as synonyms.

The present invention is also advantageous for laminates comprising thin glass sheets, since sintering enamels on thin glass is even more prone to produce off-spec bended sheets with optical flaws. In a preferred embodiment of the invention, at least one of the glass sheets has a thickness of less than 2.1 mm, such as 1.8 mm, less than 1.8 mm; less than 1.6 mm; less than 1.4 mm; less than 1.0 mm; or less than 0.9 mm.

Area A

Laminates according to the invention may comprise one or more films A, but at least one thin film A is oriented adjacent to a glass surface of the laminated glass according to the invention.

It is also possible to apply a film A to both glass surfaces, such that a laminated glass laminate with a layer sequence glass/film A/film B/film A/glass is provided.

The dry-film thickness of the printed area is between 1-50 μm depending on printing technique and required opacity. Usually the dry-film thickness is between 10-30 μm. A high enough total dry-film thickness can be achieved by overlaying ink-layers through repetition of sequential printing/coating steps.

Film A in the starting state prior to lamination may have a thickness ratio to film B of less than 0.2.

The thickness of a film A in the starting state prior to lamination is 10-250 μm, preferably 20-160 μm, more preferably 30-120 μm, still more preferably 40-100 μm, and most preferably 50-80 μm. This range of thickness does not include additional printing layers/coating layers on the films. In the laminated glass, the thickness of the film can increase by transfer of plasticiser from film B.

Film A is produced separately from film B (for example extruded or solvent cast) and has either no plasticiser at all or sufficiently small proportion of plasticiser so that subsequent functionalization and processing is not adversely influenced.

Since film A will preferably be in direct contact with one of the inner surface of the laminated glass, it is desirable to control its adhesion to an intermediate level in order to reach satisfactory penetration resistance mandatory for the different glazing positions of a motor vehicle as stipulated in the different safety glass standards like ECE 43R. To this end, film A may contain alkali metal ions and/or earth alkali metal ions to adjust their adhesion level to glass (so called Anti-Adhesion Additives).

As alkali metal ions, potassium or sodium or lithium are preferred. Preferred ranges of concentration of the alkali metal ions are 7-210, preferably 14-140 and more preferably 21-140 ppm in the case of lithium, 23-690, preferably 46-460 and more preferably 69-460 ppm in the case of sodium and 39-1170, preferably 78-780 ppm and more preferably 117-780 in the case of potassium. It is furthermore preferred to add the alkali metal ions in form of salts of carboxylic acids having 1 to 10 carbon atoms. Especially preferred is potassium acetate as an adhesion control agent.

The total amount of alkali metal salts may be as low as 0.005% by weight based on the weight of film A. Preferred ranges of alkali metal salt are 0.01%-0.1%; 0.02-0.08%; 0.03-0.06%, each weight % based on the weight of film A.

Film A used in the laminates of the invention may additionally comprise alkaline earth ions, but since their effect on adhesion is limited, only small amounts as compared to the alkali ion should be used. In a first embodiment of the invention film A comprises 0 to 20 ppm alkaline earth ions, preferably 0 to 5 ppm.

However, it is known that alkaline earth ions have a balancing effect of adhesion when a plasticized PVB film faces two glass sheets with different surface chemistry. Accordingly, in a second embodiment of the invention, film A comprises 5-20 ppm alkaline earth ions. The alkaline earth ions can be added in the form of salts of carboxylic acids having 1 to 10 carbon atoms. Especially preferred is magnesium acetate as a secondary adhesion control agent. In this embodiment, the ratio of alkali ions to alkaline earth ions in ppm in film A is preferably at least 1, especially higher than 5 and more preferably higher than 10.

As an alternative to the amount of alkali and earth alkali ions, the alkaline titer of film A and B may be used to characterize the amount of anti-adhesion agents (i.e. alkali and earth alkali salts) in the films. The alkaline titer of film A may be higher than 10, higher than 20, higher than 40, higher than 50, higher than 80, higher than 90 and preferably higher than 100, in each case with a maximum value of 500. In contrast to film A, the alkaline titer of film B is preferred to be lower, and more preferably the difference between alkaline titer (film A)—alkaline titer (film B) is more than 2, more preferably more than 6 and most preferably more than 10 AT units.

In order to avoid haze, the amount of chloride ions and/or nitrate ions and/or sulphate ions in film A may be reduced.

The chloride content of the film A can thus be less than 150 ppm, preferably less than 100 ppm, and in particular less than 50 ppm. In the ideal case, the chloride content of the film A is less than 10 ppm or even 0 ppm.

The nitrate content of film A optionally may be less than 150 ppm, preferably less than 100 ppm, and in particular less than 50 ppm. In the ideal case, the nitrate content of film A is less than 10 ppm or even 0 ppm.

Again optionally, the sulphate content of film A may be less than 150 ppm, preferably less than 100 ppm, and in particular less than 50 ppm. In the ideal case, the sulphate content of the film A is less than 10 ppm or even 0 ppm.

Film B

Film B may be any plasticized PVB-film known in the art. The films A and B may contain, in the starting state prior to lamination and/or in a stack prepared for lamination between glass sheets, a single plasticiser as well as mixtures of plasticisers both of different and identical composition. The term "different composition" refers to both the type of plasticiser and proportion thereof in the mixture. Film A and film B after lamination, i.e. in the finished laminated glass, preferably have the same plasticisers WA and WB. In a preferred variant, film A in its starting state, however, does not contain any plasticiser and after lamination contains plasticiser WB in an equilibrium amount.

Plasticiser-containing films B used in accordance with the invention contain, in the starting state prior to lamination, at least 22% by weight, such as 22.0-45.0% by weight, preferably 25.0-32.0% by weight and in particular 26.0-30.0% by weight of plasticiser.

Films A used in accordance with the invention may contain, in the starting state prior to lamination, less than 22% by weight (such as 21.9% by weight), less than 18% by weight less than 16% by weight, less than 12% by weight, less than 8% by weight, less than 4% by weight, less than 2% by weight, less than 1% by weight or even no plasticiser (0.0% by weight). In a preferred embodiment of the invention, films A with a low plasticiser content preferably contain 0.0-8% by weight of plasticiser, most preferably 0-4 wght %.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The thickness of film B in the starting state is 450-2500 μm, preferably 600-1000 μm, and more preferably 700-900 μm. A plurality of films B may be used in the invention, either being stacked on each other or separated by films A.

If films B are stretched prior to production of the sandwich and/or additionally are adapted to the shape of a screen (for example a windscreen) in a curved manner, the specified thicknesses at the moment of lamination may reduce once more by up to 20%.

Polyvinyl Acetal The films A and B used in accordance with the invention contain polyvinyl acetals, which are produced by acetalisation of polyvinyl alcohol or ethylene vinyl alcohol copolymer.

The films can contain polyvinyl acetals, each having a different polyvinyl alcohol content, degree of acetalisation, residual acetate content, ethylene proportion, molecular weight and/or different chain lengths of the aldehyde of the acetal groups.

In particular, the aldehydes or keto compounds used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinylacetal used in accordance with the invention results in particular from the reaction of at least one polyvinyl alcohol with one or more aliphatic unbranched ketocompounds containing 2 to 10 carbon atoms. To this end, n-butyraldehyde is preferably used.

The polyvinyl alcohols or ethylene vinyl alcohol copolymers used to produce the polyvinyl acetals in the films A or B may be identical or different, pure or a mixture of polyvinyl alcohols or ethylene vinyl alcohol copolymers with different degree of polymerisation or degree of hydrolysis.

The polyvinyl acetate content of the polyvinyl acetals in the films A or B can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes or keto compounds.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The polyvinyl alcohol content of the polyvinyl acetal PA used in film A may be between 6-26% by weight, 8-24% by weight, 10-22% by weight, 12-21% by weight, 14-20% by weight, 16-19% by weight and preferably between 16 and 21% by weight or 10-16% by weight.

Independent of film A, the polyvinyl alcohol content of the polyvinyl acetals PB used in film B may be between 14-26% by weight, 16-24% by weight, 17-23% by weight and preferably between 18 and 21% by weight.

In a preferred embodiment of the invention, film A comprises a polyvinyl acetal PA with a proportion of vinyl alcohol groups from 6 to 26% by weight and the film B comprises a polyvinyl acetal B with a proportion of vinyl alcohol groups from 14 to 26% by weight.

Plasticizer

Films A and/or B used in accordance with the invention may contain, as plasticiser, one or more compounds selected from the following groups:

esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.

esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids;

Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid.

By definition, plasticisers are organic liquids having a high boiling point. For this reason, further types of organic liquids having a boiling point above 120° C. can also be used as plasticisers.

Films A in the variants in which a plasticiser WA is present in film A in the starting state, and also films B, most preferably contain 1,2-cyclohexane dicarboxylic acid diisononyl ester (DINCH) or triethylene glycol-bis-2-ethyl hexanoate (3G0 or 3G8) as plasticiser.

Film B may consist of at least two sub-films B' and B", which have a different plasticiser content.

In addition, films A and B may contain further additives, such as residual quantities of water, UV absorber, antioxidants, adhesion regulators, optical brighteners or fluorescent additives, stabilisers, colorants, processing aids, inorganic or organic nanoparticles, pyrogenic silicic acid and/or surface active substances.

In particular, film B may comprise 0.001 to 0.1% by weight of alkaline metal salts and/or alkaline earth salts of carboxylic acids as adhesion control agents. It is preferred that film B contains magnesium ions in an amount of at least 10 ppm, preferably 20 ppm and most preferably 30 ppm.

Lamination Process

The present invention also relates to a method for producing the described glass laminates, in which the film A is positioned on a glass sheet, then covered by at least one film B, and a second glass sheet is then applied.

Alternatively, it is possible for film B to be positioned on a glass sheet, then to be covered by at least one film A, and for a second glass sheet to be applied.

The present invention relates furthermore to a method for producing a laminated glass wherein a stack comprising at least one film A and at least one film B is provided, the stack is positioned on a first glass sheet and a second glass sheet is then applied.

It is possible in accordance with the invention to first melt the film A onto a glass sheet over the entire area or locally by increased temperature and to then cover this with the film B.

Alternatively, films A and B can be positioned jointly between two glass sheets and melted at increased temperature.

The lamination step for producing a laminated glass is preferably carried out such that films A and B are positioned between two glass sheets and the layered body thus prepared is pressed under increased or reduced pressure and increased temperature to form a laminate.

To laminate the layered body, the methods with which a person skilled in the art is familiar can be used with and without prior production of a pre-laminate.

So called "autoclave processes" are carried out at an increased pressure from approximately 10 to 15 bar and temperatures from 100 to 150° C. during approximately 2 hours. Vacuum bag or vacuum ring methods, for example according to EP 1 235 683 B1, function at approximately 200 mbar and 130 to 145° C.

Vacuum laminators may also be used. These consist of a chamber that can be heated and evacuated, in which laminated glazings can be laminated within 30-60 minutes. Reduced pressures from 0.01 to 300 mbar and temperatures from 100 to 200° C., in particular 130-160° C., have proven their worth in practice.

In the simplest case, in order to produce the laminated glass laminates, film A or B is positioned on a glass sheet, and the further film B or A is positioned synchronously or subsequently.

The second glass sheet is then applied and a glass film laminate is produced. Excessive air can then be removed with the aid of any pre-lamination method known to a person skilled in the art. Here, the layers are also already firstly lightly adhesively bonded to one another and to the glass.

The glass film laminate may then be subjected to an autoclave process. Film A is preferably positioned on the first glass sheet and covered by the thicker film B before the second glass sheet is applied. The method can be carried out in many conceivable and, in principle, practicable variants. For example, film A is easily removed from a roll of an appropriate width, whereas film B has been tailor-cut beforehand to the size of the laminated glass to be produced. This is advantageous in particular in the case of windscreens and other automotive glazing parts. In this case, it is particularly advantageous to additionally still stretch the thicker film B before it is tailor cut. This enables a more economical use of film, or, for the case in which film B has a colour tint, allows the adaptation of the curvature thereof to the upper sheet edge.

In the automotive field, in particular for the production of windscreens, films A and/or B may be provided with a coloured region like an ink ribbon in the upper region of the films. To this end, either the upper part of film B can be co-extruded with a suitably coloured polymer melt.

In accordance with the invention, films B may therefore have a colour tint, which in particular has already been adapted in a prior process step to the geometry of a windscreen by the above described shaping process.

It is also possible for the films B to have a wedge-shaped thickness profile. The laminated glass laminate according to the invention obtains a wedge-shaped thickness profile even with plane-parallel thickness profile of the film A and can be used in motor vehicle windscreens for HUD displays.

Furthermore, film B may comprise at least two layers wherein the amount of plasticizer WB in the layers differs by least 2% by weight. For sound-damping purposes, film B comprises 3 layers of which the core layer is softer due to higher plasticizer content.

In the simplest case, film B is a commercially available PVB film with or without ink ribbon and with or without a wedge-like thickness profile. Films B with nanoparticles dispersed therein for IR protection can also be used as coloured films. Of course, a film B may also be a film having an acoustic function, such that soundproofing properties that are further improved are obtained by combination with a film A, and of course, a film B may already also combine a number of the mentioned functions.

The thin films A are generally produced by extrusion with use of a cast-film line or in the form of a blown film. Here, a surface roughness may also be produced by controlled melt fracture or with the cast-film method additionally by use of a structured chill roll and/or structure back roll. Alternatively, solvent-cast method can be used for producing film A prior to functionalization and use in the described penetration resistant glass laminates. Films used in accordance with the invention preferably have a one-sided surface structure with a roughness Rz from 0 to 25 pm, preferably an Rz from 1 to 20 µm, more preferably an Rz from 3 to 15 µm, and in particular an Rz from 4 to 12 pm. It is particularly preferable if the side of film A coming into contact with the glass sheet has a surface roughness Rz of no more than 20% of its thickness.

EXAMPLES

Polysmooth PVB film from the company Polymaker, with a refractive index of 1.48970, was 3d-Printed with a Raise3D N2 plus 3D-printer at 215° C. nozzle temperature, 70° C. heated build plate, a printing speed of 90 mm/s and layer thickness of 100 µm onto glass and co-laminated with a PVB film with a plasticizer content of 27.5% and a refractive index of 1.47979. This laminate appeared transparent but exhibited the optical properties described above. In another example, a pattern was punched out of a PVB film with a thickness of 100 µm and a refractive index of 1.48995 and co-laminated with a PVB film with a plasticizer content of 27.5% and a refractive index of 1.47979.

In a third example, white coloured Polysmooth PVB film from the company Polymaker was 3D printed to form a structure which is flat from one side and shows different thicknesses on the other. A film was 3D-printed with clear Polysmooth PVB filament to match the high differences, so that when combined, both outer surfaces of the film appear flat, enabling a lamination with flat glass.

The invention claimed is:

1. A laminated glass, comprising two sheets of glass, adhered by an adhesive film comprising at least one film B containing a polyvinyl acetal PB and at least one plasticiser WB; and at least one film A containing a polyvinyl acetal PA and optionally at least one plasticiser WA, wherein the refractive indices of film A and film B differ by at least 0.0002, wherein the thickness of film A is from 5 µm to 20 µm, and wherein film A prior to lamination has a thickness ratio to film B of less than 0.2, wherein the laminated glass has two surface areas and at least three edge areas and when the laminated glass is illuminated from one of the edge areas or surface areas, an indicia of genuineness from layer A is visible.

2. The laminated glass of claim 1, wherein at least one of the edge areas or surface areas is provided with an illumination device or sunlight.

3. The laminated glass of claim 1, wherein prior to combining the two glass sheets, the amount of plasticiser WA in film A is less than 45% by weight and the amount of plasticiser WB in film B is less than 45% by weight.

4. The laminated glass of claim 1, wherein film A is provided by printing a melt comprising polyvinyl acetal PA and optionally at least one plasticiser WA on or into film B.

5. The laminated glass of claim 4, wherein film A covers only a portion of film B.

6. The laminated glass of claim 1, wherein film A is provided by combining film B with a cut out or punched pattern of a film A comprising polyvinyl acetal PA and optionally at least one plasticiser WA.

7. The laminated glass of claim 1, wherein the film A is sandwiched between two films B comprising the same or a different polyvinyl acetal PB and at least one plasticiser WB.

8. The laminated glass of claim 1, wherein film A further comprises at least one of an inorganic filler, pigment or dye.

9. The laminated glass of claim 1, wherein film B further comprises at least one of an inorganic filler, pigment or dye.

10. The laminated glass of claim 1, wherein the thickness ratio of film A to film B is greater than 0.002 and less than 0.2.

11. The laminated glass of claim 1, wherein film B comprises at least two layers wherein the amount of plasticizer WB in the two layers differs by least 2% by weight.

12. The laminated glass of claim 1, wherein the film B has a wedge-shaped thickness profile.

13. The laminated glass of claim 1, wherein the refractive indices of film A and film B differ by at least 0.01006.

14. A process for detecting whether a genuine PVB interlayer has been used in a glass laminate, comprising a step of illuminating a laminated glass comprises two sheets of glass, combined by an adhesive film comprising at least one film B containing a polyvinyl acetal PB and at least one plasticiser WB; and at least one area A which is an indicia of genuineness containing a polyvinyl acetal PA and optionally at least one plasticiser WA, wherein the refractive indices of area A and film B differ by at least 0.0002, illuminating said glass laminate from an edge area, and visually identifying the presence or absence of said indicia.

15. A laminated glass, comprising two sheets of glass, adhered by an adhesive film comprising at least one film B containing a polyvinyl acetal PB and at least one plasticiser WB; and at least one film A containing a polyvinyl acetal PA and optionally at least one plasticiser WA, wherein the refractive indices of film A and film B differ by at least 0.0002, wherein the thickness of film A is from 5 μm to 20 μm, wherein film A prior to lamination has a thickness ratio to film B of less than 0.2, and wherein a pattern composed of film A becomes visible when illuminated from an edge region of the laminated glass.

16. The laminated glass of claim 1, wherein polyvinyl acetal PB and polyvinyl acetal PA both consist of poly(n-butyraldehyde).

\* \* \* \* \*